Nov. 28, 1961  R. P. OBRIN  3,010,768
ELECTRO-PNEUMATIC BRAKE SYSTEM
Filed Feb. 26, 1960
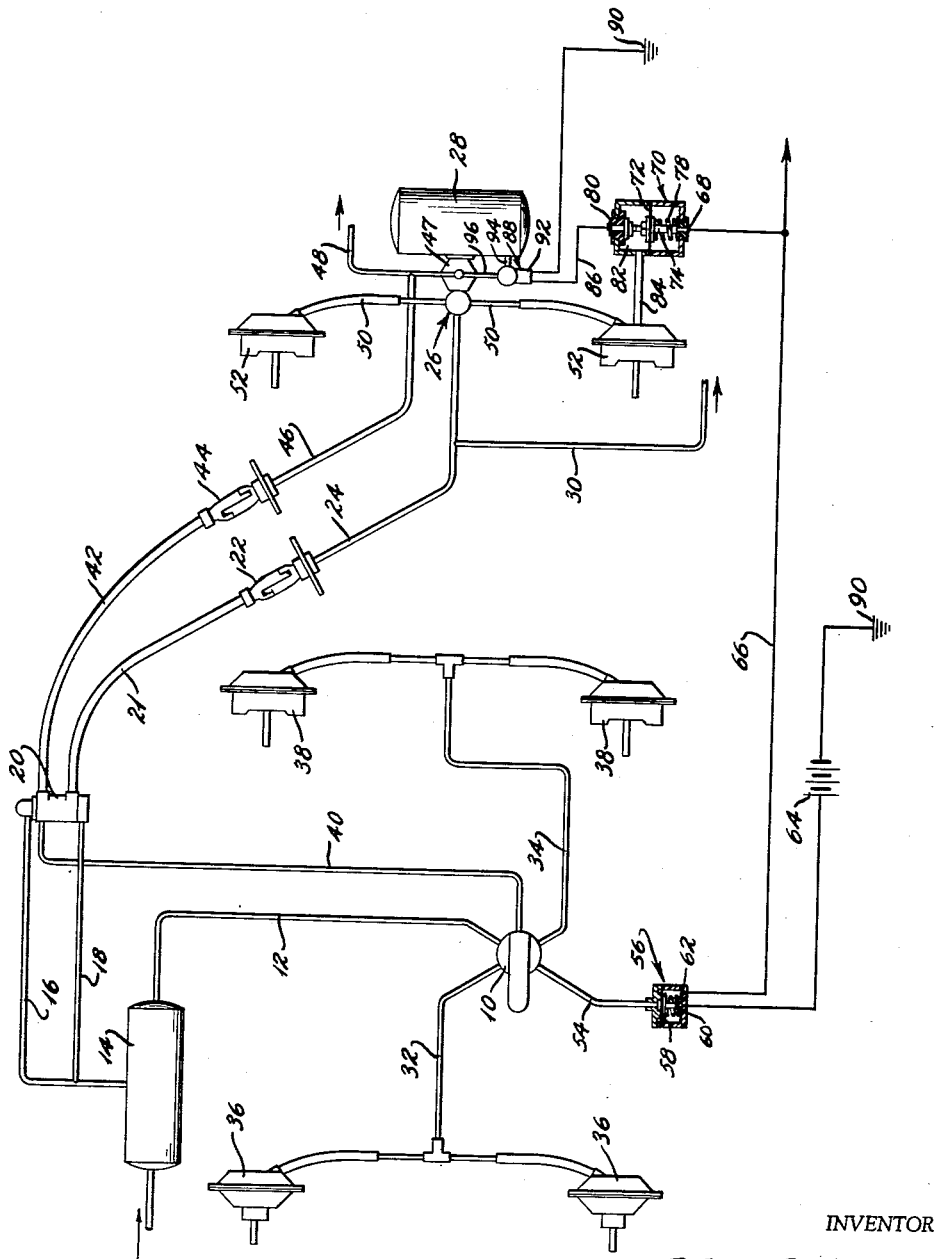
INVENTOR
*Robert P. Obrin*
BY
*Scrivener & Parker*
ATTORNEYS

United States Patent Office 3,010,768
Patented Nov. 28, 1961

3,010,768
ELECTRO-PNEUMATIC BRAKE SYSTEM
Robert Paul Obrin, Elyria, Ohio, assignor to Bendix-Westinghouse Automotive Air Brake Company, Elyria, Ohio, a corporation of Delaware
Filed Feb. 26, 1960, Ser. No. 11,259
2 Claims. (Cl. 303—7)

This invention relates to fluid pressure braking systems and more particularly to an electro-pneumatic braking system particularly, though not exclusively, adapted for use with multi-vehicle automotive trains.

Fluid pressure brake systems which include switch means closed by depression of a brake pedal to energize a distant magnet valve for effecting synchronization of brakes on a vehicle train are well known. In such systems, the magnet valve is adjacent an auxiliary reservoir and an associated relay valve, with the magnet valve, upon energization, admitting a shot of control air from the auxiliary reservoir to the control chamber of the relay valve. Upon this occurrence, air is admitted to those brake chambers served by the relay valve before service pressure can travel from the brake valve to the relay valve. When service pressure eventually arrives at the relay valve, the magnet valve serves no other useful function though it usually remains energized so long as a brake pedal is depressed and this tends not only to cause overheating of the magnet valve during a prolonged braking period but its continued energization may interfere with driver control of the brakes. To avoid the foregoing disadvantages, a system has been proposed whereby as the brake pedal is depressed it brushes by a switch which momentarily energizes the magnet valve to admit a shot of control pressure to the relay valve and hence a shot of braking pressure to the brake chambers. Such systems are undesirable because the driver has substantially no control over the volume of the shot of air delivered to the relay valve and this can vary over a wide range depending upon the speed with which the brake pedal is depressed, such speed determining the length of time that the magnet valve is energized.

It is an object of the present invention to overcome the disadvantages of prior art electro-pneumatic braking systems.

It is a more specific object of the invention to provide an electro-pneumatic brake system which includes the usual brake valve, main reservoir, one or more auxiliary reservoirs, and a relay valve associated with each auxiliary reservoir; and also includes an electrical system having a magnet valve which is energized upon depression of the brake valve to effect advanced delivery of pressure to brake chambers associated with each auxiliary reservoir, a feature of the invention residing in means for de-energizing the magnet valve when a predetermined pressure has been delivered to the brake chambers associated therewith.

More specifically, it is an object of the present invention to provide in a system of the foregoing type, means whereby a uniform, preselected, advance pressure can be delivered to the brake chambers by a magnet valve and thereafter the magnet valve is de-energized in response to brake chamber pressure and the system operates as if the electrical part thereof did not exist therein.

Still another object of the invention is to provide an electro-pneumatic system of the foregoing nature which in the event of electrical failure does not in any way interfere with the normal control of the brakes in response to regular service pressure supplied by the brake valve.

Other objects are to provide an electro-pneumatic braking system which is particularly suited for use with unusually long, multi-vehicle trains; which uses conventional components; and is readily and economically installed in existing equipment.

Other objects and their attendant advantages will become apparent as the following detailed description is read in conjunction with the single figure which is a schematic view of a conventional tractor-semi-trailer braking system having associated therewith the electrical system of the present invention.

Referring now to the drawing, a conventional tractor-semi-trailer braking system is illustrated as comprising a pedal operated brake valve 10 which is connected by a conduit 12 to a main reservoir 14 which in turn is connected by conduits 16, 18 to the respective control and emergency ports of a tractor protection valve 20 which may be of the same type as that shown in the patent to Andrews, No. 2,850,330. The emergency line is connected through the valve 20 to a coupling hose 21 which leads rearwardly of the tractor and is connected by way of conventional "glad hand" coupling members 22 to a trailer emergency line 24 which leads through a conventional trailer relay-emergency valve 26 to a trailer auxiliary reservoir 28. A branch emergency line 30 may be connected to the conduit 24 and lead rearwardly of the trailer to a second trailer (not shown).

The brake valve 10 has connected thereto tractor service conduits 32, 34 leading respectively to the forward and rear tractor brake chambers 36, 38 and the brake valve has also connected thereto a trailer service conduit 40 which leads to the service port of the tractor protection valve 20 and is connected through said valve to a flexible coupling line 42 which in turn is connected by way of "glad hand" couplings 44 to a trailer service conduit 46 connected to the control chamber 47 of the relay emergency valve 26. A branch service conduit 48 may lead rearwardly of the trailer to be connected to the aforementioned second trailer.

The relay emergency valve 26 is connected by conduits 50 to the trailer brake chambers 52 in the usual manner. As recognized by those skilled in the art when the brake pedal 10 is depressed service braking pressure is delivered via conduits 32, 34 to the tractor brake chambers 36, 38 and is also delivered via conduit 40, valve 20, and lines 42, 46 to the control chamber 47 of the relay emergency valve 26 which is opened by service pressure to admit fluid pressure from the auxiliary reservoir 28 to the trailer brake chambers 52 by way of conduits 50. The system so far described is in all respects conventional and in such systems it has been recognized, particularly where more than one trailer is involved, that a certain period of time is required for the service pressure to flow from the brake valve through the relatively long service conduit to the relay emergency valve of each of the towed vehicles. This can result in a delayed brake application on the towed vehicles causing possible jack-knifing and consequent serious accident.

Attempts to overcome the foregoing dangers by means of electrically operated advance valves have been proposed but such systems have been subject to the disadvantages above mentioned. To overcome these disadvantages, particularly the problem of a continuously energized magnet advance valve, the present invention provides an electrically operated advance system wherein the magnet valve is de-energized after a predetermined pressure has been delivered to the trailer brake chambers. To accomplish this the brake valve 10 has connected thereto an auxiliary service line 54 leading to the control chamber of a fluid pressure switch 56 containing a diaphragm 58 which when pressure is admitted to the upper surface thereof is moved downwardly to complete a circuit between electrical contacts 60, 62. The contact 60 is connected to a source of electrical energy such as the battery 64 and the contact 62 is connected by way of an electrical conductor 66 to a terminal 68 in a second fluid pressure switch 70 carried on the trailer. The switch 70 contains a diaphragm 72 which centrally carries a conductor rod 74 extending above and below the diaphragm with the latter being urged by an electrically conducting spring 78 so that the upper end of the conductor rod 74 is normally in engagement with an upper terminal 80 which extends downwardly into a fluid pressure control chamber 82 of the switch 70. When fluid pressure is admitted to the control chamber 82 by way of a conduit 84 whose opposite end is connected to one of the brake chambers 52, the diaphragm 72 is moved downwardly against the force of spring 78 to move the upper end of rod 74 out of electrical contact with the terminal 80.

The outer end of terminal 80 is connected by way of an electrical conductor 86 to one terminal of a conventional solenoid or magnet valve 88 whose other terminal is grounded at 90 as shown. The magnet valve 88 may be similar to the valve shown in the patent to Turner, No. 1,299,269 wherein when the solenoid 92 is energized a valve member (not shown) is unseated to connect a conduit 94 leading to the auxiliary reservoir 28 to a conduit 96 leading to the inlet of the control chamber 47 of the relay emergency valve 26.

As has been mentioned, the operation of the non-electrical part of the braking system shown is well known. The electrical system of the invention operates as follows: When the brake valve pedal is depressed to deliver service pressure to the service conduits 32, 34, 40, service pressure is also delivered by way of conduit 54 to the fluid pressure switch 56 causing the diaphragm 58 to be depressed and the circuit completed through the switch to the fluid pressure switch 70 on the trailer. Current flows from the terminal 68 of the switch 70 through spring 78, conducting rod 74, terminal 80, and via conductor 86 to the magnet valve 88 which is opened to admit reservoir pressure from reservoir 28 to the control chamber of relay emergency valve 26 by way of conduits 94, 96. Immediately upon the opening of valve 26, pressure is admitted by way of conduits 50 to the trailer brake chambers 52 and as the pressure builds up in that chamber which is connected to switch 70, the pressure simultaneously builds up in the control chamber 82 of the switch and when this pressure exceeds the setting of the spring 78 the diaphragm 72 moves downwardly to break the connection between conducting rod 74 and terminal 80 thereby de-energizing the solenoid 92 of the magnet valve 88 to permit said valve to move to closed position and disconnect conduits 94, 96. Depending upon the predetermined loading of the spring 78, service pressure will be received from the brake valve 10 by way of conduits 40, 46 at the relay valve at substantially the same time as the diaphragm 72 of the pressure switch is moved to open the circuit to the magnet valve 88 and thus the service pressure takes over the control of the pressure delivered to the brake chamber. It is within the purview of the invention that the one or more trailers which may be rearwardly of the first trailer may have increasingly heavier loading of each spring 78 to insure opening of the circuit to the magnet valve substantially simultaneously with the arrival of the service pressure at the respective brake valve, though it should be understood that if only a predetermined relatively low pressure is desired, for example, only sufficient to take up brake slack then each spring may have the same uniform relatively low loading.

From the foregoing description it should be apparent that the present invention provides a means for positively insuring that uniform pressure is delivered to the brake chambers of the trailer in advance of the service pressure regardless of the degree or speed of brake pedal depression and that pressure surges into the service line from both extreme ends which decreases the charging time thereof. It will be furthermore apparent that the system of the invention positively de-energizes the magnet valve after delivery of the predetermined pressure to the trailer brake chambers and that should the electrical system ever fail in any way it cannot interfere with normal brake operation. It will be further apparent that the invention is susceptible of a variety of modifications without, however, departing from the scope and spirit of the appended claims.

What is claimed is:

1. In combination with an air brake system, including interconnected main and auxiliary pressure reservoirs, a brake valve and a relay valve having a control chamber and being responsive to service pressure delivered to said control chamber by said brake valve for controlling the flow of pressure from said auxiliary reservoir to brake chambers connected thereto, an electrically operated system for connecting said brake chambers to said auxiliary reservoirs in advance of service pressure delivered to said control chamber from said brake valve comprising a normally open switch operatively connected to said brake valve and movable to closed position in response to movement of said brake valve in a brake applying direction, a source of electrical energy connected to said switch, a second normally closed fluid pressure switch electrically connected through said first switch to said source of electrical energy, means affording a fluid connection between said auxiliary reservoir and the control chamber of said relay valve, a normally closed magnetically opened valve in said fluid connection, said valve being electrically connected to said second fluid pressure switch, and means affording a fluid connection between the brake chambers and said second fluid pressure switch, said switch being responsive to a predetermined pressure in said brake chambers to disconnect said magnetically opened valve from said source of electrical energy.

2. In combination with a tractor trailer braking system which includes a brake valve on the tractor, and interconnected pressure source, brake chambers, and relay valve on the trailer, said relay valve having a control chamber which upon the admission of fluid pressure thereto connects said brake chamber and said pressure source, a source of electrical energy, a magnet valve carried on the trailer, normally open switch means carried on the tractor for controlling a connection between said electrical source and said magnet valve, a fluid connection between said pressure source and said control chamber and normally closed by said magnet valve, means for closing said switch means in response to movement of said brake valve in a brake applying direction, and means responsive to a predetermined pressure in said brake chamber for disconnecting said magnet valve from said source of electrical energy independently of said switch means.

References Cited in the file of this patent

UNITED STATES PATENTS 808,022    Dewson _____ Dec. 19, 1905